June 27, 1961  R. L. ELLSWORTH  2,990,480
IMPEDANCE CONTROLLED CROSS-COUPLED ONE-SHOT MULTIVIBRATOR
Filed July 15, 1958
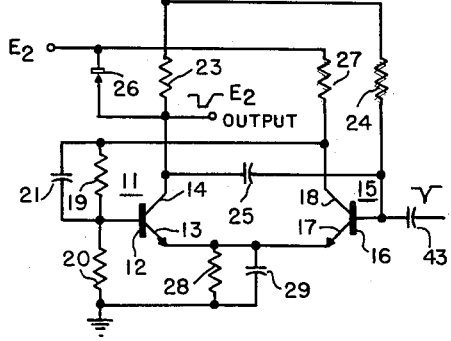
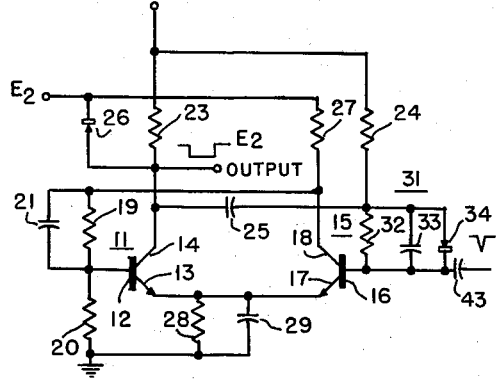
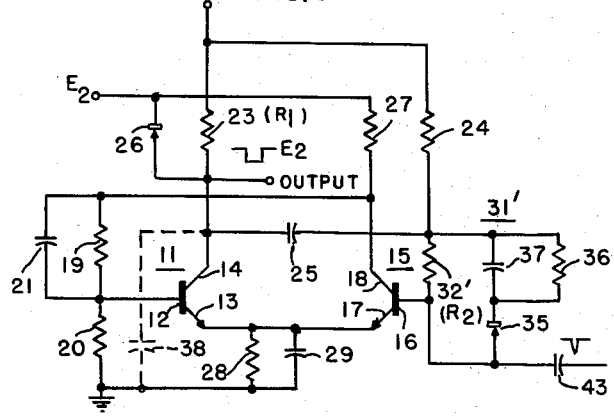
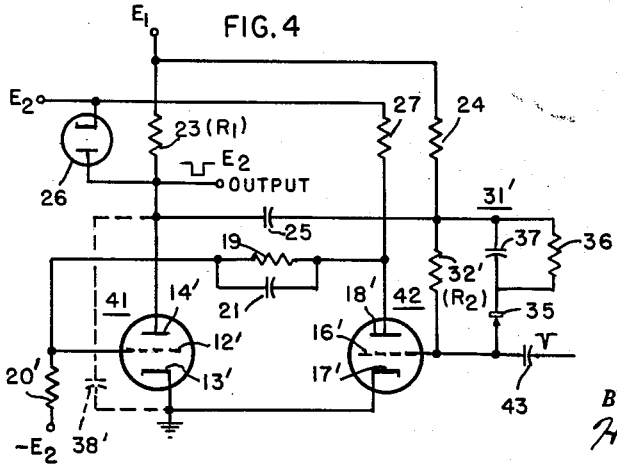
*INVENTOR,*
R. L. ELLSWORTH.
BY Harry M. Saragovitz
ATTORNEY.

United States Patent Office 2,990,480
Patented June 27, 1961

2,990,480
IMPEDANCE CONTROLLED CROSS-COUPLED ONE-SHOT MULTIVIBRATOR
Robert Lee Ellsworth, Berkeley, Calif., assignor to the United States of America as represented by the Secretary of the Army
Filed July 15, 1958, Ser. No. 748,773
9 Claims. (Cl. 307—88.5)

The present invention relates to a one-shot or monostable multi-vibrator, and more particularly to a multivibrator of this type for producing square waves having fast leading and trailing edges, and may be employed with multivibrators using either transistors or vacuum tubes. Much of the following discussion is directed to transistor multivibrators.

The present invention is an improvement over the multivibrators of the prior art in that the normal direct connection between the base of the normally conductive transistor and the timing capacitor is replaced by a passive electrical network. This network allows a square wave to be generated with a fast leading edge, since it reduces the loading effect of the timing capacitor, and with a fast trailing edge, since the value of the ratio of the load resistor of the normally "off" transistor and the resistor of the passive electrical network is so chosen that the stray capacity from collector to ground of the normally "off" transistor, which is smaller than that of the timing capacitor, determines the charging time constant.

An object of the present invention is to provide an apparatus for generating square waves having fast leading and trailing edges.

Another object of the present invention is to provide a monostable multivibrator for generating a wave having a fast decay or trailing edge which is not dependent on the charge time of the timing capacitor of said multivibrator.

A further object of the present invention is the generation of a square wave having a fast trailing edge regardless of the pulse width.

Still another object of the present invention is the provision of a passive electrical network in a monostable multivibrator circuit to allow a waveform such as a square wave to be generated therefrom having fast leading and trailing edges.

A still further object of the present invention is to provide a pulse shaping network.

The exact nature of this invention, as well as other objects and advantages thereof, will be readily apparent from consideration of the following specification relating to the annexed drawings in which:

FIGURE 1 is a schematic drawing of a prior art type of transistor circuit for generating square waves;

FIGURES 2 and 3 are schematic drawings of embodiments of the invention using transistors; and FIGURE 4 is a schematic drawing of another embodiment of the invention using vacuum tubes.

In the drawings, like reference characters designate like or corresponding parts throughout the several views. There is shown in FIGURE 1 a monostable multivibrator comprising a first NPN junction transistor 11 having base electrode 12, emitter electrode 13, and collector electrode 14, and a second NPN junction transistor 15 having base electrode 16, emitter electrode 17, and collector electrode 18. Electrically connected between base 12 and collector 18 is the parallel combination of resistor 19 and capacitor 21. Collector 14 and base 16 are connected to a high D.C. voltage $E_1$ through collector load resistor 23 and base resistor 24, respectively, and are electrically coupled to each other by coupling capacitor (timing capacitor) 25. Collector 14 and collector 18 are electrically connected to a low D.C. voltage $E_2$ through clamping diode 26 and load resistor 27 respectively. Emitters 13 and 17 are connected to ground by low value resistor 28 and capacitor 29 connected in parallel and are therefore substantially at ground potential. Base resistor 20 is connected between base 12 and ground.

The transistorized monostable multivibrator of FIGURE 1 operates as follows:

Transistor 15 is normally conductive while transistor 11 is normally non-conductive. Therefore, to change from this stable condition to a quasi-stable state so as to derive an output pulse from collector 14 it is necessary to trigger the circuit by applying an incoming negative pulse to base 16 through condenser 43, for example. Other well known methods of triggering the circuit could be used, but for simplicity of discussion throughout this disclosure, the circuit will be discussed from the viewpoint that base 16 of transistor 15 has a negative triggering pulse applied thereto. This negative triggering pulse drives base 16 of transistor 15 negative and in the well known manner initiates a timed pulse at collector 14. The low resistance of transistor 11 enables collector 14 to drop very rapidly to the full on-condition. The multivibrator remains in this quasi-stable state until timing capacitor 25 discharges sufficiently through resistor 24 to again allow transistor 15 to start conducting. When this happens, collector 14 starts to rise back toward the high D.C. voltage $E_1$. However, when collector 14 reaches the low D.C. voltage $E_2$ it is clamped at that value by clamping diode 26 connected to $E_2$. Because timing capacitor 25 is re-charged toward $E_1$ and clamped at $E_2$, its voltage rise is both linear and rapid as compared with a circuit where timing capacitor 25 charges exponentially to $E_2$. Thus an output pulse is derived, and monostable multivibrator circuit is again operating in its stable condition. It should be noted that the discharge time constant of the multivibrator is also dependent on collector load resistor 23 and the input resistance of transistor 15 as well as on the product of timing capacitor 25 and resistor 24. In a like manner, the charging of capacitor 25 is dependent on collector load resistor 23 and the input resistance of transistor 15. A further and more comprehensive discussion on the operation of a monostable multivibrator can be found in "Pulse and Digital Circuits" by Jacob Millman and Herbert Taub, pages 174–187 (circuit utilizing tubes) and 599–692 (transistorized circuit).

It should be noted that many times it is desirable to obtain square waves having faster leading and trailing edges than can be derived from the conventional monostable multivibrator as described above, as for an example, in the operation of electronic switching circuits. The circuit refinements shown in FIGURES 2, 3, and 4 illustrate improvements in the conventional monostable multivibrator which will allow square waves to be developed that have faster leading and trailing edges.

FIGURE 2 discloses a refinement of the circuit of FIGURE 1 wherein the normal direct connection between base 16 of transistor 15 and timing capacitor 25 is replaced by a passive electrical network 31 comprising a parallel combination of resistor 32, capacitor 33, and diode 34. The components of passive electrical network 31 increase the apparent input resistance of base 16 during the discharge cycle of timing capacitor 25 since resistor 32 is in series therewith and effects the loading thereof during the discharge cycle. Therefore, a longer pulse can be generated with the same value of capacitance for timing capacitor 25, or equivalent to that, the same width pulse can be generated with a smaller value of capacitance for timing capacitor 25. The discharge of timing capacitor 25 occurs during the leading edge and bottom portion of each of the square waves. Capacitor 33 allows transistor 11 to more quickly reach its quasi-stable stage since it acts as a feedback between collector 14 and base 16. Therefore the leading edge is sharpened or speeded up. During the charging cycle of timing capacitor 25, which occurs during the trailing edge of each square wave, resistor 32 is effectively shorted by diode 34. Therefore, network 31, as a whole, allows for the generation of square waves having a long duration, and at the same time it allows for the preservation of fairly sharp leading and trailing edges of the square waves.

FIGURE 3 is a refinement of the circuit of FIGURE 2 in that the passive electrical network 31 of FIGURE 2 is replaced by passive electrical network 31'. Passive electrical network 31' comprises a resistor 32' connected between base 16 of transistor 15 and one end of timing capacitor 25 and connected in parallel with a parallel combination of resistor 36 and capacitor 37 connected in series with diode 35. Further, there is shown as dashed lines stray capacity 38 between collector 14 and ground.

With the monostable multivibrator connected as shown in FIGURE 3 the shape of the trailing edge of the square wave is independent of timing capacitor 25. The charge time constant is primarily dependent on the charge time of stray capacity 38, through load resistor 23. This is accomplished by proportioning collector load resistor 23 ($R_1$) to resistor 32' ($R_2$) so that the voltage on collector 14 side of capacitor 25 will rise to a value of D.C. voltage of $E_2$ or greater without capacitor 25 recharging through load resistor 23 ($R_1$) and resistor 32' ($R_2$). The formula for this is given by:

$$\frac{E_1 - E_2}{E_2} = \frac{R_1}{R_2}$$

This permits the square wave developed at collector 14 to have an extremely fast trailing edge. In addition the trailing edge of the square wave is speeded up and is linear because it charges toward $E_1$ and is clamped at $E_2$. The same type of linear charge speed-up of stray capacity 38 is obtained as was obtained with large timing capacitor 25 of FIGURE 1.

Since the collector 14 side of timing capacitor 25 reaches voltage $E_2$ without any charging of timing capacitor 25, time must be allowed for this after the completion of the quasi-stable state, before another cycle can be initiated. The charge time of timing capacitor 25 is substantially determined by the capacitance of timing capacitor 25 times the resistance of resistor 32' ($R_2$) in series with the input resistance of transistor 15.

Since the input resistance of transistor 15 in FIGURE 3 is necessarily low, the collector load resistor 23 in many cases cannot be much larger than the sum of resistor 32' and the input resistance of transistor 15. This means that a time as long as several pulse intervals would be required before the unit could generate another accurate time pulse.

Resistor 32' also has a beneficial effect on the leading edge of the output square wave. Without resistor 32' collector 14 would be tied to the low resistance of base 16 by large timing capacitor 25, thus slowing the leading edge of the square wave at collector 14. However, with resistor 32' inserted, the leading edge of the square wave is not appreciably slowed down by the loading of timing capacitor 25 provided small speed-up capacitor 37 and diode 35 are added, as shown in FIGURE 3, to couple a portion of the leading edge of the waveform developed at base 16 of transistor 15. Capacitor 37 and diode 35 allow transistor 11 reach its quasi-stable state more quickly and therefore speed up the leading edge of the square wave. Resistor 36 serves as a discharge leak for capacitor 37 since diode 35 won't conduct when reversed biased.

The grounded emitter connection was used throughout FIGURES 1, 2 and 3 with NPN junction transistors. PNP transistors work in an identical manner to develop a positive going timing pulse. The circuits are applicable for both grounded emitter and grounded base connections. However, the grounded emitter connection is to be preferred.

FIGURE 3 is a direct analog to a vacuum tube one-shot multivibrator as are FIGURES 1 and 2. In a vacuum tube circuit where the input grid resistance is very high compared to the input resistance of transistor 15, as in FIGURE 3, it is practical to use a value of resistance of resistor 24 many times greater than the sum of resistor 32' and the input resistance of transistor 15. This permits a charge time constant product of timing capacitor 25 and resistor 23 of much shorter duration than the discharge time constance product of resistor 24 and timing capacitor 25. Under these conditions a new cycle of operation could be generated shortly after the completion of the last cycle and still have advantages of only charging stray capacity 38' in FIGURE 4, up to clamping voltage $E_2$. For this reason the vacuum tube circuit is better for applications requiring a very high repetition rate.

In FIGURE 4 is shown the vacuum tube equivalent of FIGURE 3. In this figure the plate, grid and cathode of tube 41 and tube 42 correspond to the collector, base, and emitter respectively of transistors 11 and 15. Reference numerals of corresponding elements are primed. The other elements of the monostable multivibrator are connected as in FIGURE 3 except that tubes 41 and 42 replace transistors 11 and 15. The values of the resistors, capacitors, D.C. voltages, etc. vary according to the difference in operating characteristics between transistors and tubes.

It should be understood, of course, that the foregoing disclosure relates only to preferred embodiments of the invention and that numerous modifications or alterations may be made therein without departing from the spirit and the scope of the invention as set forth in the appended claims.

Multi-electrode device, conductive device, and discharge device are terms generic for electron tube, semiconductor device, and transistor and is intended to be so construed in the claims.

What is claimed is:

1. In combination, first and second discharge devices interconnected to provide a trigger circuit having one degree of electrical stability, each of said discharge devices having a collector electrode and control electrode a first capacitor, a passive electrical network including resistive means, a diode, and a speed-up capacitor connected in series with said first capacitor, said first capacitor and said passive electrical network connecting the collector electrode of said first device to the control electrode of said second device, a second capacitor connecting the collector electrode of said second device to the control electrode of said first device, a resistor directly shunting said second capacitor, and a connection including a resistor between the control electrode and emitter electrode of said first device, whereby said first device is normally non-conductive and said second device normally conductive when said trigger circuit is in its stable state.

2. The combination of claim 1 wherein said resistive means of said passive electrical network comprises first and second resistors, said first resistor shunting said speed-up capacitor, said diode connected in series with said speed-up capacitor, and said second resistor shunting the series combination of said speed-up capacitor and said diode.

3. The combination of claim 1 wherein said resistive means, said speed-up capacitor, and said diode are connected in parallel.

4. The combination of claim 2 wherein said first and second discharge devices are transistors.

5. The combination of claim 3 wherein said first and second discharge devices are transistors.

6. In a trigger circuit comprising first and second electron discharge device each having anode and grid electrodes, impedance elements interconnecting the anode of each of said discharge devices with the grid of the other discharge device, such that said trigger circuit has only one degree of electrical stability. a passive electrical network forming a portion of the impedance element connected between the anode of said first discharge device and the grid of said second discharge device, said passive electrical network comprising a first resistor, a capacitor shunting said first resistor, a diode in series with said capacitor, and a second resistor shunting the series combination of said capacitor and said diode.

7. The combination of claim 2 wherein said first and second discharge devices are transistors.

8. In a monostable multivibrator, first and second semiconductors devices, each having a control electrode, a collector electrode, and an emitter electrode, an impedance, a first means for supplying an operative potential to said first semiconductor device, said impedance being connected between said first supply means and the collector electrode of said first semiconductive device, a second means for supplying an operative potential to said second semiconductor device, a rectifier connected between said second supply means and the collector electrode of said first semiconductor device, a reactance network connected between the control electrode of said first semiconductor device and the collector electrode of said second semiconductor device, a timing capacitor, a first resistor connected in series with said timing capacitor, said timing capacitor and said first resistor being connected between the collector electrode of said first semiconductor device and the control electrode of said second semiconductor device, said first supply means being connected to the junction of said timing capacitor and said first resistor, a speed-up capacitor, a second resistor shunting said speed-up capacitor, and a diode in series with said condenser, said diode and said speed-up capacitor shunting said first resistor, whereby when $$\frac{E_1-E_2}{E_2}=\frac{R_1}{R_2}$$

where:

$E_1$ is the potential value of said first supply means,
$E_2$ is the potential value of said second supply means,
$R_1$ is the resistive value of said impedance, and
$R_2$ is the resistive value of said first resistor, the charge time of said multivibrator is primarily dependent upon the charge of a stray capacity through said impedance.

9. The multivibrator of claim 8 wherein $E_1$ is greater than $E_2$.

References Cited in the file of this patent
UNITED STATES PATENTS

| | | |
|---|---|---|
| 2,778,978 | Drew | Jan. 22, 1957 |
| 2,803,747 | Woods | Aug. 20, 1957 |
| 2,844,723 | Jameson | July 22, 1958 |
| 2,859,340 | Dunham et al. | Nov. 4, 1958 |
| 2,903,607 | Danner et al. | Sept. 8, 1959 |

FOREIGN PATENTS

| | | |
|---|---|---|
| 635,137 | Great Britain | Apr. 5, 1950 |

UNITED STATES PATENT OFFICE
CERTIFICATE OF CORRECTION

Patent No. 2,990,480                      June 27, 1961

Robert Lee Ellsworth

It is hereby certified that error appears in the above numbered patent requiring correction and that the said Letters Patent should read as corrected below.

Column 6, line 4, for "condenser" read -- speed-up capacitor --.

Signed and sealed this 2nd day of January 1962.

(SEAL)
Attest:

ERNEST W. SWIDER
Attesting Officer

DAVID L. LADD
Commissioner of Patents